C. S. SKEEM.
POTATO DIGGER.
APPLICATION FILED AUG. 12, 1913.
1,103,321.
Patented July 14, 1914.
2 SHEETS—SHEET 2.
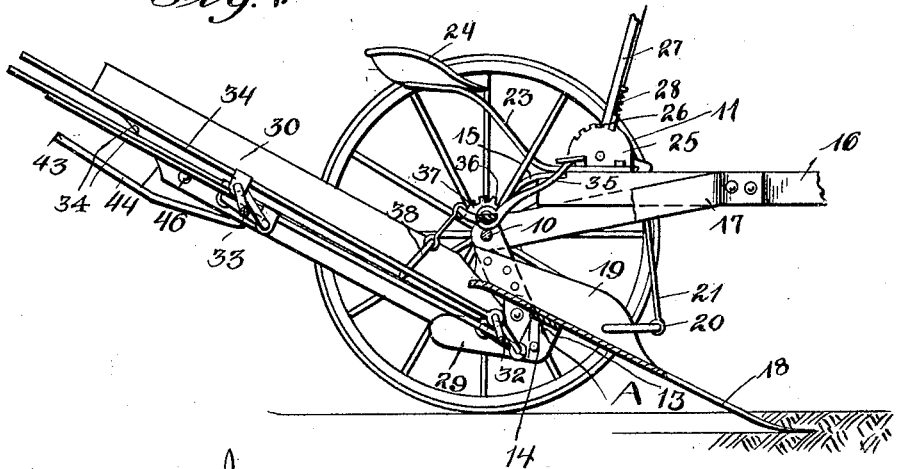
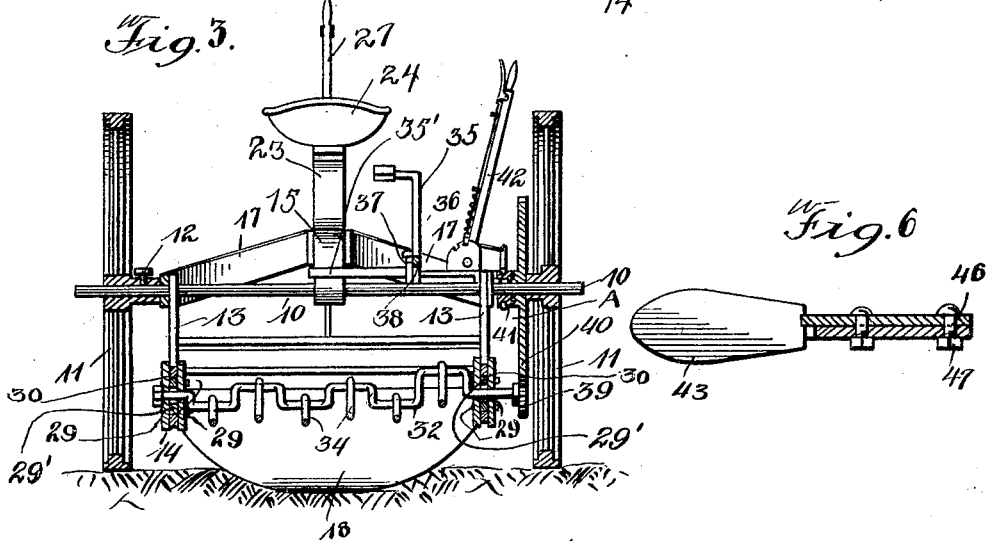
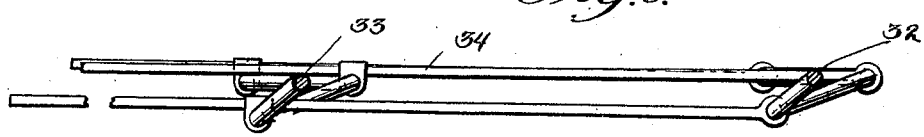
Witnesses
Ernest Crocker
Henry P. Bright
Inventor
C. S. Skeem
By
Attorneys

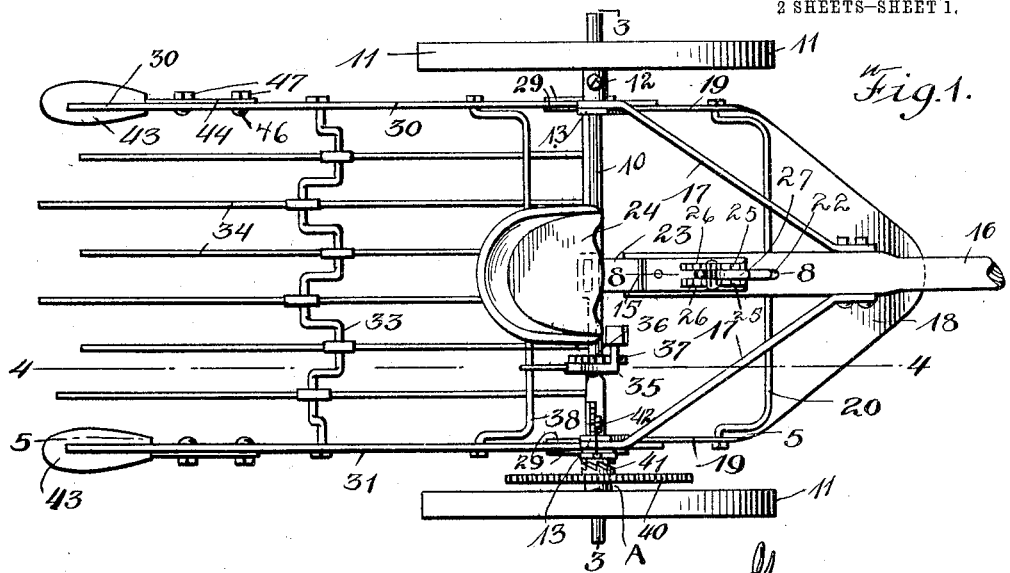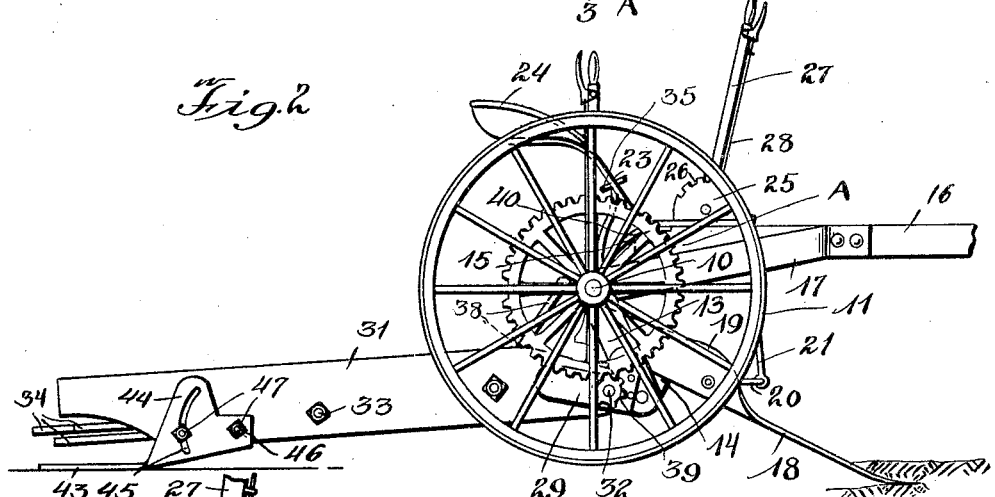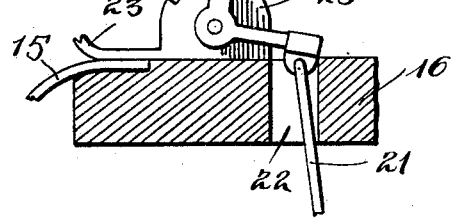

UNITED STATES PATENT OFFICE.

CHRISTIAN S. SKEEM, OF INKOM, IDAHO.

POTATO-DIGGER.

1,103,321.

Specification of Letters Patent.   Patented July 14, 1914.

Application filed August 12, 1913.   Serial No. 784,416.

*To all whom it may concern:*

Be it known that I, CHRISTIAN S. SKEEM, a citizen of the United States, residing at Inkom, in the county of Bannock, State of Idaho, have invented certain new and useful Improvements in Potato-Diggers; and I do hereby declare the following to be a full, clear, and exact description of the invention, such as will enable others skilled in the art to which it appertains to make and use the same.

This invention relates to potato diggers.

The object of the invention resides in the provision of a potato digger by means of which the potatoes will be dug up, thoroughly cleaned, and deposited on the ground behind the machine.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a potato digger constructed in accordance with the invention; Fig. 2, a side elevation of same; Fig. 3, a section on the line 3—3 of Fig. 1; Fig. 4, a section on the line 4—4 of Fig. 1 showing the shaking bars elevated; Fig. 5, a section on the line 5—5 of Fig. 1 showing the relation between the crank portions of the shaft which carry the shaking bars and whereby any tendency of said crank portions to bind or jerk on a dead center is obviated. Fig. 6, a detail view illustrating the mounting of the shoes for adjusting the free ends of the shaking bars vertically; Fig. 7, a detail perspective view of one of said adjusting shoes, and Fig. 8, a section on the line 8—8 of Fig. 1.

Referring to the drawings the machine is shown as comprising an axle 10 upon which are fixed traction wheels 11. These traction wheels 11 are adapted to be adjusted longitudinally of the axle 10 and are held in fixed positions on said axle by means of set screws 12 mounted in the hubs of said wheels.

Pivotally supported upon the axle 10 is a frame A which includes depending side members 13 and a cross member 14 connecting the free ends of said side members. Pivotally supported upon the axle 10 is a bracket 15 to which is connected the inner end of a tongue 16. The connection between this tongue 16 and the axle 10 is strengthened by means of brace bars 17 the forward ends of which are secured to respective sides of the tongue 16 while the rear ends of said brace bars are pivotally mounted upon the axle.

Secured to the frame A is the inner end of a digger 18 which includes side members 19. Pivotally mounted in the side members 19 respectively are the terminals of a bail 20 and this bail is pivotally connected to one end of a link 21 which extends through a passage 22 in the tongue 16.

Mounted upon the tongue 16 is a seat bracket 23 which carries the usual operator's seat 24. Suitably mounted upon the bracket 23 are spaced ears 25 one of which is notched as at 26. Pivoted between the ears 25 is an angle lever 27 provided with a spring pawl 28 adapted to coöperate with the notches 26. One end of the angle lever 27 is pivotally connected to the upper end of the link 21 so that upon manipulating said lever 27 the forward or the cutting end of the digger 18 may be adjusted up and down.

Projecting rearwardly from the frame A at each side of the latter are brackets 29 between which are fixed washers 29′ and upon these washers are pivotally mounted the inner ends of beams 30 and 31 which extend longitudinally of the machine. Journaled between the brackets 29 is a plural crank shaft 32, which is surrounded by the washer 29′. A corresponding plural crank shaft 33 is journaled between the beams 30 and 31 and corresponding crank portions of these shafts are connected by shaker bars 34. It will be noted that the crank portions of the shafts 32 and 33 adjacent the beam 31 are arranged in advance of the remaining crank portions of said shafts so as to avoid any tendency of said crank shafts to bind and jerk when passing over dead centers during their rotation.

Pivotally mounted upon a suitable bracket 35′ for movement longitudinally of the machine is a lever 35. This lever 35 carries a spring pawl 36 which coöperates with a toothed plate 37 also mounted upon the bracket 35′ and whereby the lever is locked against pivotal movement. The end of the lever 35 nearest its pivot is connected to a bail 38, said bail having its terminals pivotally connected to the beams 30 and 31 respectively. By this construction it will be apparent that by moving the lever 35 in one direction the shaker bars 34 will be elevated, while the reverse movement of said lever will allow the shaker bars to fall under the influence of gravity.

Fixed on one end of the shaft 32 is a gear 39 which meshes with a gear 40 loosely mounted on the axle 10 and adapted to be connected to said axle through the medium of a clutch 41 operated by a lever 42 suitably mounted upon the machine.

Pivotally mounted against the outer side of each of the beams 30 and 31 at the free ends of said beams are shoe members 43. Each of these shoe members 43 includes an upwardly extending portion 44 provided with an arcuate slot 45 through which projects a threaded shank 46 mounted in the adjacent beam. Engaged on this shank 46 is a binding nut 47 which when operated inwardly will clamp the upwardly extending portion 44 between same and the adjacent beam so as to lock the shoe against pivotal movement. By adjusting these shoes 43 on their pivots it will be apparent that the free ends of the beams 30 and 31 and the shaker bars 34 can be supported at different elevations to suit the requirements of the particular work in hand.

From the foregoing description taken in connection with the accompanying drawing it will be apparent that as the machine is moved along the ground the potatoes will be delivered from the digger 18 to the shaker bars 34 and as these bars are connected to the crank shafts 32 and 33 it will be further apparent that a back and forth and up and down motion will be imparted to said bars which will efficiently clean the potatoes before same are worked to the free ends of said bars and delivered to the ground.

What I claim is:—

1. In a potato digger, the combination with a wheeled axle of a frame pivotally suspended from said axle, rearwardly extending beams having their inner ends pivotally connected to said frame, a plural crank shaft journaled on said frame, connections between said shaft and the axle for rotating the former, a plural crank shaft journaled between said beams, said crank shafts each having a corresponding crank portion disposed in advance of the remaining crank portions, shaker bars connecting the corresponding crank portions of said shafts respectively, and a digger element carried by said frame.

2. In a potato digger the combination with a wheeled axle, of a frame pivotally suspended from said axle, rearwardly extending beams having their inner ends pivotally connected to said frame, means for supporting the free ends of said beams at different elevations from the ground, a plural crank shaft journaled on said frame, connections between said crank shaft and the axle for rotating the former, a plural crank shaft journaled between said beams, shaker bars connecting the corresponding crank portions of said shaft respectively, and a digger element carried by said frame.

3. In a potato digger, the combination with a wheeled axle, of a frame pivotally suspended from said axle, rearwardly extending beams having their inner ends pivotally connected to said frame, a plural crank shaft journaled in said frame, connections between said shaft and the axle for rotating the former, a plural crank shaft journaled between said beams, shaker bars connecting the corresponding crank portions of said shafts respectively, and a digger element carried by said frame.

In testimony whereof, I affix my signature, in the presence of two witnesses.

CHRISTIAN S. SKEEM.

Witnesses:
HENRY M. BISHOP,
MAUDE M. KELLY.

Copies of this patent may be obtained for five cents each, by addressing the " Commissioner of Patents, Washington, D. C."